(12) United States Patent
Henderson

(10) Patent No.: US 10,926,784 B2
(45) Date of Patent: Feb. 23, 2021

(54) HAND TRUCK AND PALLET SYSTEM AND METHOD OF USE

(71) Applicant: Wade Henderson, Garland, TX (US)

(72) Inventor: Wade Henderson, Garland, TX (US)

(*) Notice: Subject to any disclaimer, the term of this patent is extended or adjusted under 35 U.S.C. 154(b) by 0 days.

(21) Appl. No.: 16/194,321

(22) Filed: Nov. 17, 2018

(65) Prior Publication Data
US 2019/0152502 A1   May 23, 2019

Related U.S. Application Data

(60) Provisional application No. 62/587,941, filed on Nov. 17, 2017.

(51) Int. Cl.
*B62B 1/14* (2006.01)

(52) U.S. Cl.
CPC ............ *B62B 1/14* (2013.01); *B62B 2203/22* (2013.01); *B62B 2203/24* (2013.01); *B62B 2203/72* (2013.01)

(58) Field of Classification Search
CPC ..................................... B62B 1/14; B62B 1/06
See application file for complete search history.

(56) References Cited

U.S. PATENT DOCUMENTS

| | | | | |
|---|---|---|---|---|
| 5,417,541 A * | 5/1995 | Herron | .................. | B62B 3/0618 414/346 |
| 5,722,515 A * | 3/1998 | Wyse | ...................... | B60T 11/04 188/22 |
| 6,237,925 B1 * | 5/2001 | Koenig | ...................... | B62B 1/12 280/47.28 |
| 6,309,168 B1 * | 10/2001 | Holmes | ...................... | B62B 1/14 414/444 |
| 6,457,727 B1 * | 10/2002 | Tolly | .......................... | B62B 1/14 280/47.19 |
| 7,712,582 B2 * | 5/2010 | Burton | ...................... | B62B 1/12 187/238 |
| 8,888,112 B2 * | 11/2014 | Trapnell | .................... | B62B 1/14 280/47.29 |
| 9,840,350 B2 * | 12/2017 | Moran | ...................... | B62B 3/06 |
| 10,464,586 B2 * | 11/2019 | Kalinowski | ............. | B62B 3/001 |
| 2006/0055134 A1 * | 3/2006 | McLoughlin | ............. | B62B 1/10 280/47.28 |
| 2014/0001721 A1 * | 1/2014 | Benko | ..................... | B62B 5/025 280/47.28 |
| 2017/0297881 A1 * | 10/2017 | King | ....................... | B66F 9/065 |

* cited by examiner

*Primary Examiner* — Jonathan Snelting
(74) *Attorney, Agent, or Firm* — Richard Eldredge; Leavitt Eldredge Law Firm

(57) ABSTRACT

A hand truck for use loading and unloading items from a pallet, the hand truck having a base having a arms spaced evenly apart; a back having two or more rails, the two or more rails extending upward from two or more of the arms of the base; a handle secured to the back; and two or more wheels attached to the two or more rails; the two or more arms, the two or more rails, and the two or more wheels are horizontally aligned, thereby creating a spacings for allowing one or more elongated members of the pallet and/or shelving to fit therethrough.

4 Claims, 8 Drawing Sheets

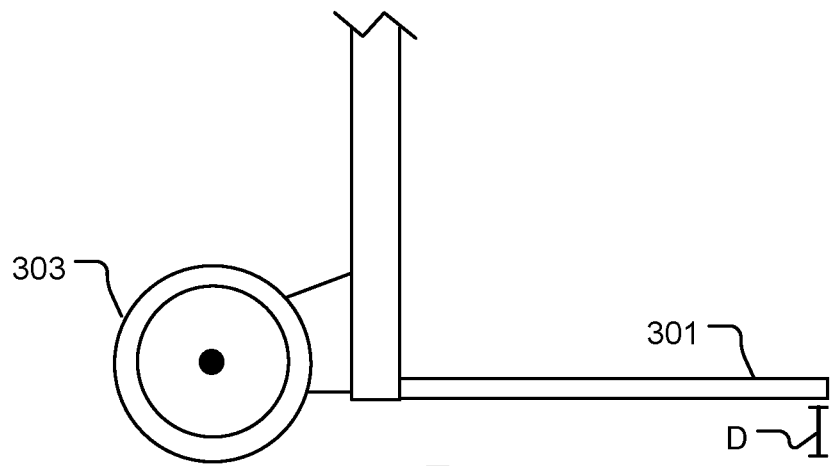
FIG. 3
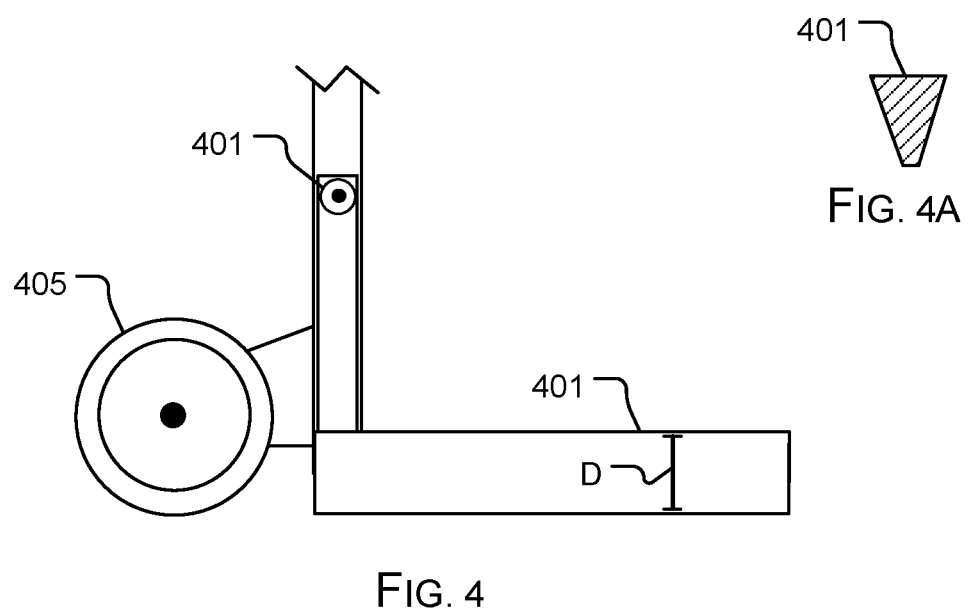
FIG. 4A
FIG. 4

HAND TRUCK AND PALLET SYSTEM AND METHOD OF USE

BACKGROUND

1. Field of the Invention

The present invention relates generally to merchandise moving systems, and more specifically, to a hand truck, pallet and shelving system for efficiently moving and storing merchandise.

2. Description of Related Art

Merchandise moving systems are well known in the art and are effective means to move items from one location to another, particularly large and/or boxed items within storage. For example, FIG. 1 depicts a conventional hand truck 101 for use in a merchandise moving system. Hand truck 101 having a base 103 for receiving boxes thereon, two wheels 105a-b, and a back 107. During use, the user places one or more boxes on base 103 for transport.

One of the problems commonly associated with system 101 is inefficiency. For example, hand truck 101 requires manual loading and unloading, thereby taking excessive man power, energy, and time.

Accordingly, although great strides have been made in the area of merchandise moving systems, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

FIG. 3 is a partial side view of a base of FIG. 2 in accordance with the present application;

FIG. 4 is a partial side view of the base of FIG. 2 in accordance with an alternative embodiment of the present application;

FIG. 4A is an end cross sectional view of the arm of FIG. 4;

Figure 1:
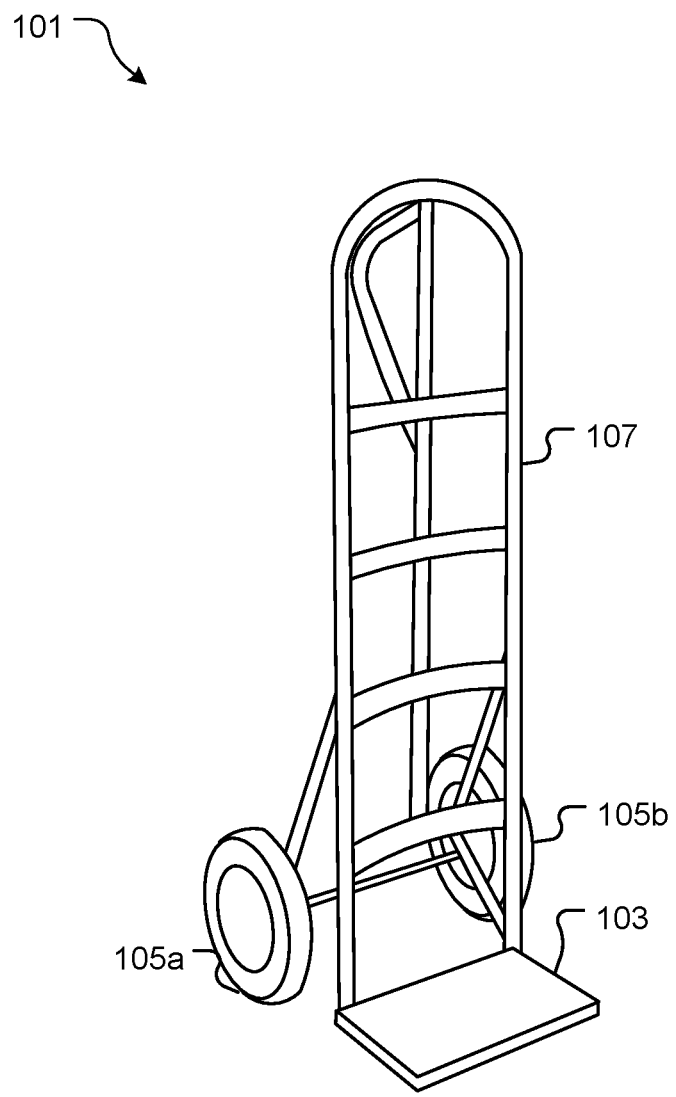
FIG. 1 is an oblique view of a common hand truck.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional merchandise moving systems. Specifically, the present invention provides a hand truck, pallet, and shelving system that are designed to engage together, thereby eliminating the need for a user to manually load and unload the hand truck. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 2:
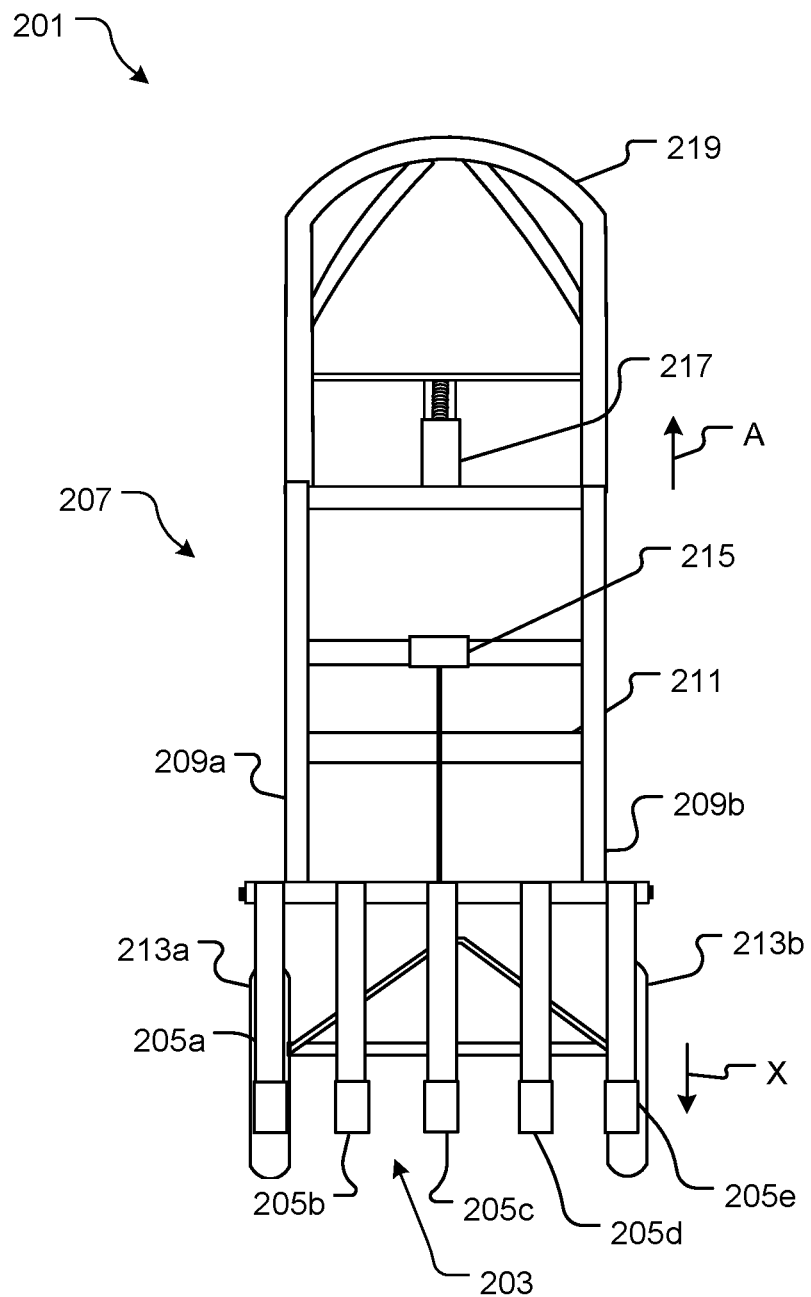
FIG. 2 is a front view of a hand truck in accordance with a preferred embodiment of the present application.
Figure 5:
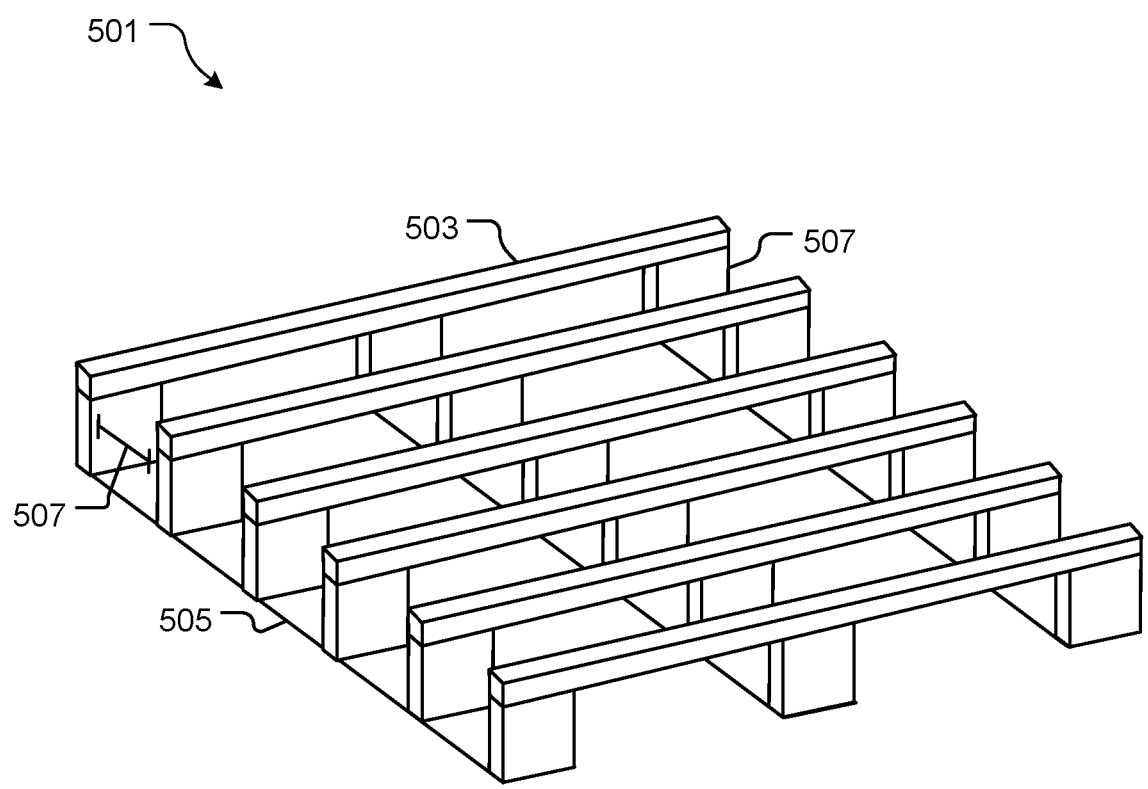
FIG. 5 is an oblique view of a pallet in accordance with the present application.

Referring now to the drawings wherein like reference characters identify corresponding or similar elements throughout the several views, FIG. 2 depicts a front view of a hand truck 201 in accordance with a preferred embodiment of the present application. It will be appreciated that hand truck 201, in combination with a pallet 501, as shown in FIG. 5, creates a system that overcomes one or more of the above-listed problems commonly associated with conventional merchandise moving systems.

In the contemplated embodiment, hand truck 201 includes a base 203 being compose of a plurality of arms 205a-e with even spacing therebetween. It should be appreciated that there can be more or less arms than shown. Arms 205a-e are attached to a back 207. Back 207 can be composed of one or more rails 209a, 209b attached via one or more support pieces 211. Two wheels 213a, 213b are further attached to hand truck 201 in a position directly behind two of the arms, thereby keeping the spacing clear between each arm.

Hand truck 201 can further include additional features, such as a disc break 215 which is in communication with rails 209a, 209b and is configured to release the rails to move toward the ground, as shown with arrow X, thereby allowing for the user to easily place the load on a ground surface. In addition a spring 217 can be included to raise the rails back into a locked position, as shown with arrow A.

In FIGS. 3 and 4, two partial side views demonstrate alternative embodiments of arms 301, 401 of the base. Arm 301 is held a distance (D) above a ground surface via the height of a wheel 303. Arm 401 is held above a distance (D) via the depth of the arm itself and wheel 405. In FIG. 4A, a cross sectional end view of arm 401 is shown, showing a unique shape of the arm, wherein the sides are angled together. It should be appreciated that this feature allows for the arm to be guided to the ground surface via a pallet.

Figure 4B:
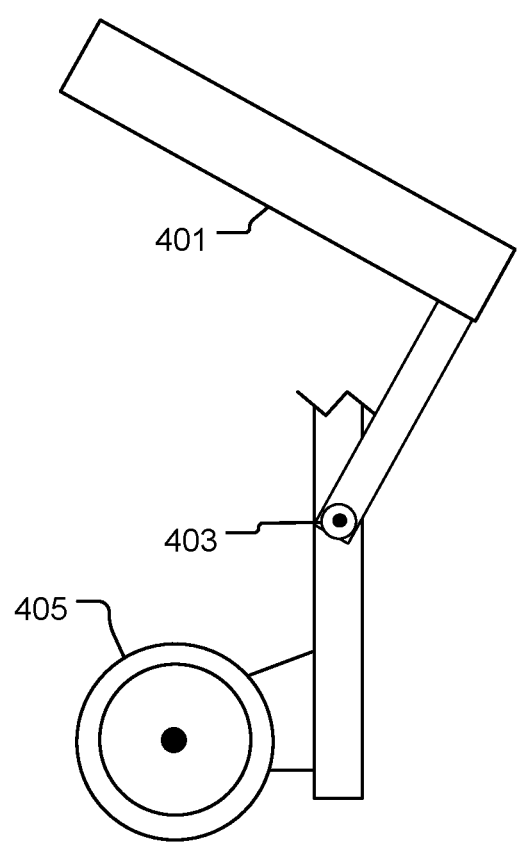
FIG. 4B is the partial side view of FIG. 4 with the arm raised via a pivoting attachment.

As shown in FIGS. 4A and 4B, the arm can be attached via a pivot point 403, thereby allowing for the outside arms to be raised as needed.

It should be appreciated that one of the unique features believed characteristic of the present application is the separation of the arms of the base of the hand truck, thereby creating clear spacing through to the back of the hand truck. It should be appreciated that this feature allows for the hand truck to engage with the pallet 501 for efficient merchandise movement. It should further be appreciated that the unique configuration of the plurality of arms of the hand truck, and their connection to one another and the wheels, allows for the hand truck to be easily pushed completely through a pallet, thereby allowing for the user to move from one side to the other of the pallet. This feature is achieved via the clear spacing extending through the arms and wheels of the hand truck.

In FIG. 5, an oblique view of a pallet 501 for the system of the present invention is shown. Pallet 501 includes a plurality of elongated members 503 attached at a bottom via base boards 505. It should be appreciated that the elongated members 503, can be boards or be composed of alternative materials. In addition, it should be appreciated that elongated members 503 can be attached to base boards 505 via connectors 507. It should be appreciated that the pallet 501 creates a plurality of spacings 507 of equal size, the spacings 507 being sized appropriately to receive the arms of the hand truck.

Figure 6:
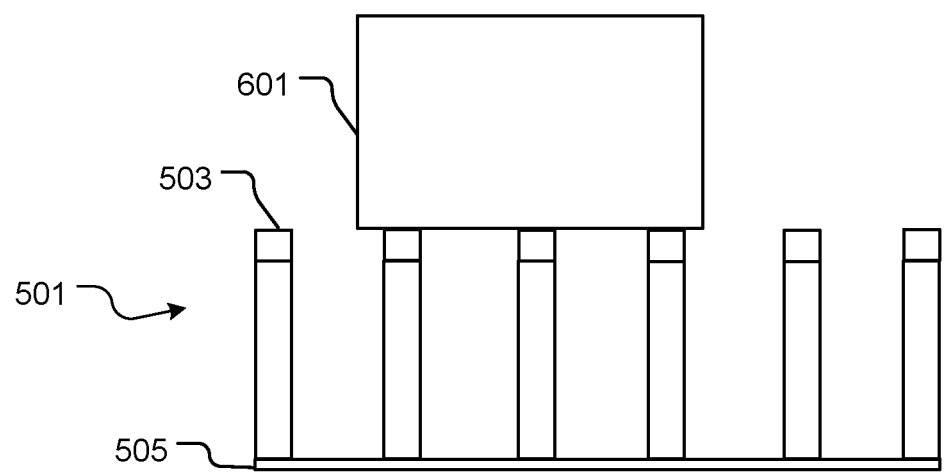
FIG. 6 is a front view of the pallet of FIG. 5.

In FIG. 6, a front view of pallet 501 holding merchandise 601 is shown, wherein merchandise 601 is configured to rest on the top of the elongated members 503.

Figure 7:
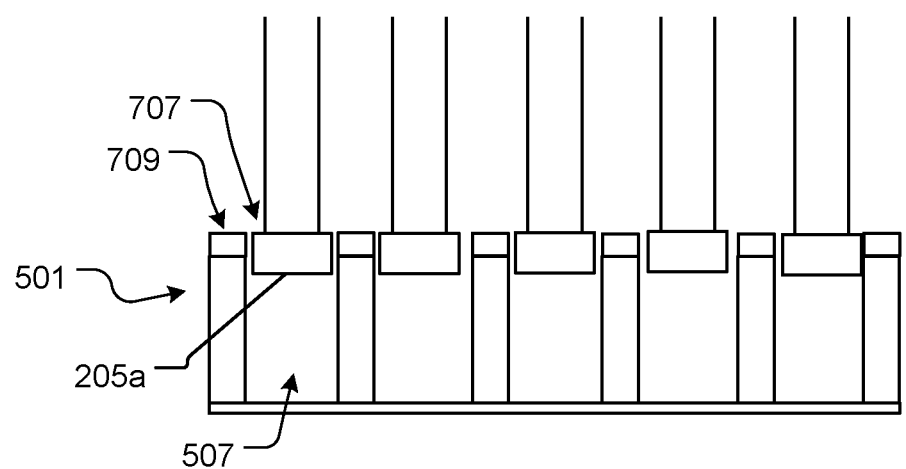
FIG. 7 is a rear view of the pallet of FIG. 5 with a plurality of arms of the hand truck engaged with the pallet.

In FIG. 7, a simplified rear view demonstrates the engagement of the plurality of arms 205a with the plurality of spacings 507 of the pallet 501. It should be understood that this figure removes the wheels and other components for clarity, demonstrating that a top surface 707 of each arm become level with the top surface 709 of each elongated member, thereby allowing for the user to engage the hand truck with the pallet and tilt the hand truck backwards to lift the merchandise efficiently without manually moving the merchandise.

Figure 8:
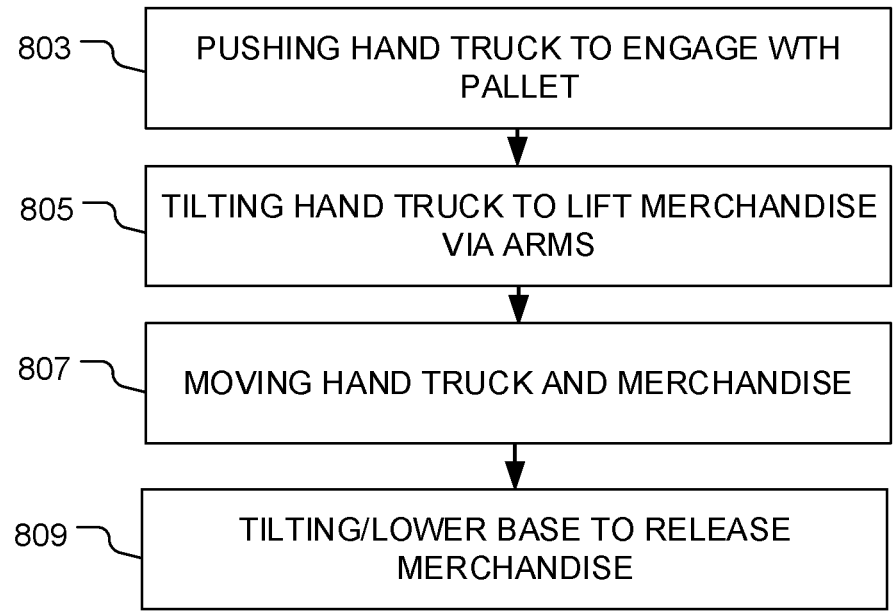
FIG. 8 is a flowchart of the method of use of the system of the present invention.

In FIG. 8, a flowchart 801 depicts the method of use of the system of the present invention. It should be appreciated that the system includes both the hand truck and the pallet as shown and described herein. During use, the user pushes the hand truck into position, wherein the plurality of arms are pushed into the spacings of the pallet, as shown with box 803. The user then tilts the hand truck backwards to force the arms upward, thereby removing the merchandise from the top of the pallet, as shown with box 805. The user can then proceed to move the merchandise to a new location, as shown with box 807. If the user is releasing the merchandise onto a shelf or pallet, the user can tilt the hand truck forward for the release, as shown with box 809. Alternatively, if the user is releasing the merchandise onto a ground surface, the user can release the disc brake, thereby lowering the base and allowing the user to tilt the hand truck for release onto the ground, as also shown with box 809.

Figure 9:
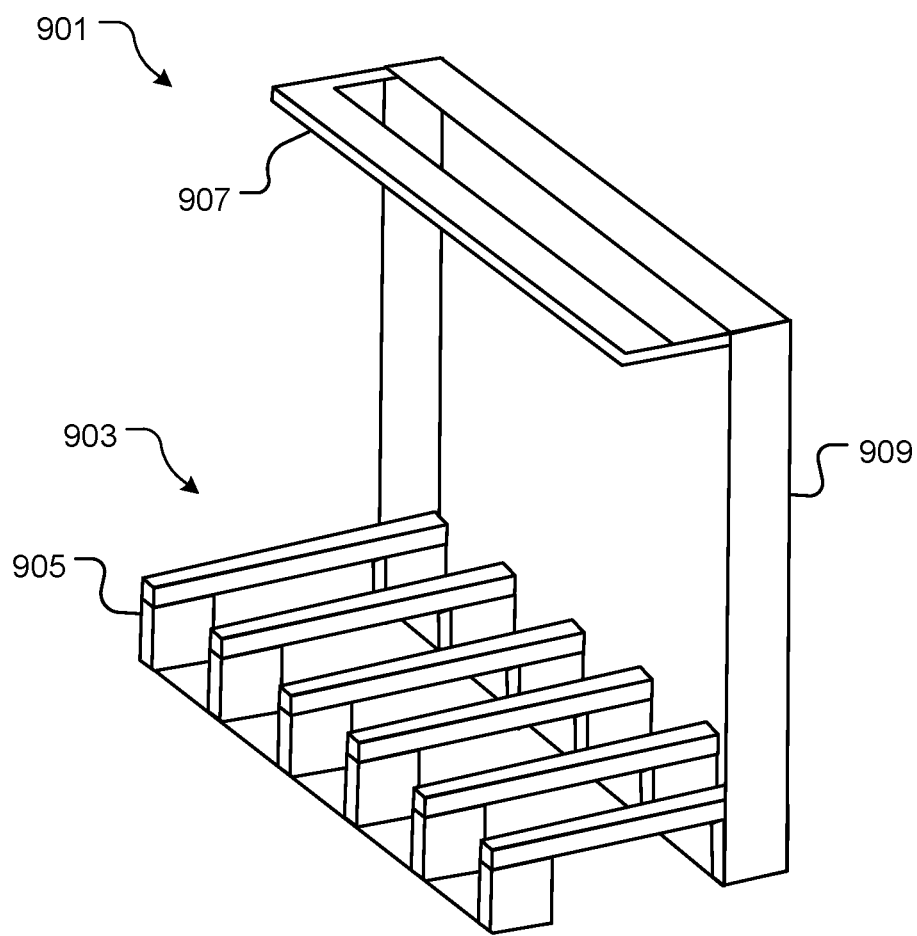
FIG. 9 is an oblique view of a shelving apparatus in accordance with the present application.

In FIG. 9, an oblique view of a shelf 901 for use with the system of the present application is shown. Shelf 901 includes a base 903 having a plurality of arms 905 of similar shape, form, and function to the elongated members of the pallet. It should be appreciated that shelf 901 is configured to engage with the pallet to provide a shelf 907 to receive one or more objects. Shelf 907 is raised above arms 905 via a back 909.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A cargo transport system, comprising:
   a hand truck, having:
      a base with a plurality of arms extending horizontally, each of the plurality of arms having a first width;
      a back having a plurality of rails attached to and extending upward from the plurality of arms;
      two wheels attached to two of the plurality of rails;
      a plurality of spacings created between each of the plurality of arms;
   wherein the two of the plurality of rails, the two wheels, and two of the plurality of arms are horizontally aligned to create the plurality of spacings:
   a pallet, having:
      a plurality of horizontal boards with even spacings formed therebetween, each of the plurality of horizontal boards having a top surface, the top surface of each of the plurality of horizontal boards forming a horizontal plane upon which cargo can rest; and
      one or more base boards attached to bottom surfaces of the plurality of horizontal boards;
      the even spacings having a second width greater than the first width;
   wherein the one or more base boards are configured to hold the plurality of horizontal boards above a ground surface;
   wherein each of the plurality of arms fit within the even spacings; and
   wherein the plurality of arms pass completely through the even spacings and past the horizontal plane created by the top surface of each of the plurality of horizontal boards when in use, to remove the cargo from the horizontal plane.

2. The system of claim 1, wherein the hand truck further comprises a disc brake release configured to release the two or more rails from a locked position.

3. The system of claim 1, wherein the back of the hand truck further comprises:
  a first portion; and
  a second portion engaged with the first portion via a spring-loaded height adjustor;
  wherein the first portion is configured to slidingly engage with the second portion to adjust a height of the hand truck via the spring-loaded height adjustor.

4. The system of claim 1, further comprising:
  a shelving apparatus configured to engage with the hand truck, the shelving apparatus having:
    a shelf base formed by a plurality of shelf arms;
    a back extending upwards from the plurality of shelf arms; and a shelf attached to the back;
    wherein the plurality of shelf arms are configured to engage with the even spacings of the hand truck.

\* \* \* \* \*